United States Patent
Darling

(10) Patent No.: US 11,314,690 B2
(45) Date of Patent: Apr. 26, 2022

(54) REGENERATED CONTAINER FILE STORING

(71) Applicants: Randy S. Darling, Chicago, IL (US); LONGSAND LIMITED, Cambridge (GB)

(72) Inventor: Randy S. Darling, Chicago, IL (US)

(73) Assignee: LONGSAND LIMITED, Cambridge (GB)

(*) Notice: Subject to any disclaimer, the term of this patent is extended or adjusted under 35 U.S.C. 154(b) by 948 days.

(21) Appl. No.: 15/544,656

(22) PCT Filed: Jan. 29, 2015

(86) PCT No.: PCT/US2015/013517
§ 371 (c)(1),
(2) Date: Jul. 19, 2017

(87) PCT Pub. No.: WO2016/122526
PCT Pub. Date: Aug. 4, 2016

(65) Prior Publication Data
US 2018/0004766 A1    Jan. 4, 2018

(51) Int. Cl.
*G06F 16/13* (2019.01)
*G06F 16/16* (2019.01)
*G06F 16/182* (2019.01)

(52) U.S. Cl.
CPC .......... *G06F 16/137* (2019.01); *G06F 16/13* (2019.01); *G06F 16/164* (2019.01); *G06F 16/183* (2019.01)

(58) Field of Classification Search
CPC ...... G06F 16/137; G06F 16/13; G06F 16/164; G06F 16/183
See application file for complete search history.

(56) References Cited

U.S. PATENT DOCUMENTS

| | | | |
|---|---|---|---|
| 6,148,340 A | 11/2000 | Bittinger et al. | |
| 6,327,671 B1 | 12/2001 | Menon | |
| 7,584,338 B1 | 9/2009 | Bricker et al. | |
| 8,533,166 B1* | 9/2013 | Sulieman | H04L 69/04 707/693 |
| 8,650,159 B1 | 2/2014 | Zhang et al. | |
| 8,775,392 B1 | 7/2014 | Walker et al. | |
| 2004/0088274 A1* | 5/2004 | Xu | G06F 16/137 |
| 2006/0212462 A1 | 9/2006 | Heller et al. | |
| 2007/0299806 A1 | 12/2007 | Bardsley et al. | |
| 2009/0271442 A1 | 10/2009 | Young et al. | |

(Continued)

FOREIGN PATENT DOCUMENTS

EP    2782308 A1    9/2014

OTHER PUBLICATIONS

International Searching Authority, "Notification Of Transmittal Of The International Search Report And Written Opinion", PCT/US2015/013517, dated Oct. 27, 2015, XX pages.

(Continued)

*Primary Examiner* — Apu M Mofiz
*Assistant Examiner* — Dara J Glasser

(57) ABSTRACT

A regenerated container file is detected, and a file in the regenerated container file is determined that is different from any file in an existing container file related to the regenerated container file. To store the regenerated container file, the different file is sent to the data storage for storing.

16 Claims, 6 Drawing Sheets

(56) References Cited

U.S. PATENT DOCUMENTS

| | | | |
|---|---|---|---|
| 2011/0179408 A1* | 7/2011 | Nakamura | G06F 8/66 |
| | | | 717/170 |
| 2014/0181034 A1 | 6/2014 | Harrison et al. | |
| 2014/0248002 A1 | 9/2014 | Thakkar et al. | |
| 2014/0358925 A1* | 12/2014 | Jakobowski | G06F 16/13 |
| | | | 707/737 |
| 2015/0378837 A1* | 12/2015 | Bai | G06F 11/1458 |
| | | | 707/654 |

OTHER PUBLICATIONS

Vrable, M. et al., "Cumulus: Filesystem Backup to the Cloud," (Research Paper), Jan. 27, 2009, 14 pages, available at https://www.usenix.org/legacy/event/fast09/tech/full_p.

* cited by examiner

REGENERATED CONTAINER FILE STORING

BACKGROUND

Container files, such as zip files, pst files, jar foes, etc., are commonly used to store and transmit related files. For example, a user may create a container file and place multiple files into the container file. Then, to manipulate all the files, operations are performed on the single container file instead of all the files individually. For example, the container file may be stored, copied to another storage location, transmitted over a network to another device, etc. Furthermore, in some instances, the files in the container file are compressed, making it easier to transmit the container file over a network.

BRIEF DESCRIPTION OF THE DRAWINGS

Features of the present disclosure are illustrated by way of example and not limited in the following figure(s), in which like numerals indicate like elements, and in which.

DETAILED DESCRIPTION

Figure 1:
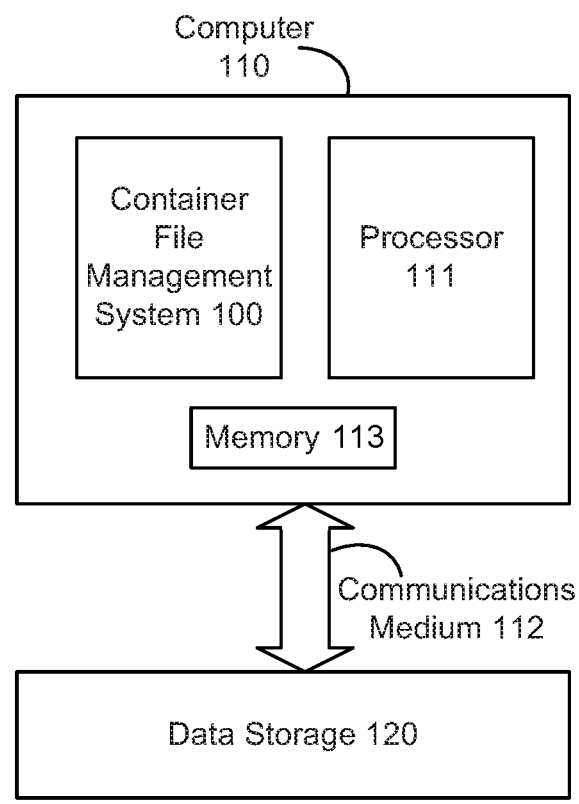
FIG. 1 shows a container file management system, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. In the present disclosure, the term "includes" means includes but not limited thereto, the term "including" means including but not limited thereto. The term "based on" means based at least in part on. In addition, the terms "a" and "an" are intended to denote at least one of a particular element.

A container file is a file that contains other files. Operations can be performed on the container file, such as copying the container file, transmitting the container file over a network, etc. These operations can be performed on the container file, so the operations do not need to be performed on each of the files in the container file individually. Some examples of container file formats are zip files, pst files and jar files. In some instance, such as a zip file, the files in the container file are compressed.

The container file, for example, is a file itself, and thus includes file metadata, such as date modified, file type, size, etc. In addition, the container file includes metadata identifying the files in the container file and storage locations of the files. According to an example of the present application, a manifest is created for the container file. The manifest is metadata identifying the files in the container file, location of the files in the container file, and location of the files in data storage. The manifest, for example, includes file position information the container file, wherein the file position information includes, for each file in the corresponding container file, unique file identifier (id), file id offset, file hash, and file length. The manifest includes file storage location information, such as file segment location information identifying location of each segment of the container file on the data storage. The file segment location information may include, for each segment of the container file, file hash, segment id, segment offset, and file length. A segment is set of contiguous bytes of predetermined length. The files in the container file may be stored in segments in the data storage.

In an example, the data storage storing the container files is an object storage, and the container files are stored as objects in the object storage. The objects may be divided into segments. The segments may be a predetermined size, such as 4 MB segments or 10 MB segments. Of course other sized segments may be used. The segments may be easier to transmit since they may be smaller in size than an entire object. In other examples, the data storage may not be object storage. For example, the data storage may be implemented as a file system or block storage.

According to an example of the present application, the container file management system determines when a regenerated container file is created that is related to an existing container file. If a regenerated container file is detected, then differences between the regenerated container file and the existing container file are determined. The differences are sent to the data storage for storing the regenerated container file instead of sending all the files for the regenerated container file to the data storage for storing. The differences may include a new file in the regenerated container file that is not in the existing container file, or a file that has been modified.

A regenerated container file is a newly generated container file that did not previously exist. This is different from modifying an existing container file. For example, it not uncommon to modify an existing container file, such as by adding a new file, deleting a file, or modifying a file contained in the container file. However, the modified container is not a newly created container file (i.e., not a regenerated container foe) but instead is an existing container file that is modified. If modifying an existing container file, the container file is open, and modifications are made to the container file, and the container file is saved with its modifications. A regenerated container file is a new container file, and there is no reference to an existing container file when it is created. For example, the regenerated container file is empty when initially created, since it is a new container file, and files are added to it. The regenerated container is not created from an existing container file, and is not created by opening and modifying an existing container file.

In some instances, a new container file is created that may include the same or similar files as an existing container file. For example, in software development, it is not uncommon to create a new container file that includes all the files for a latest version of software, instead of modifying an existing container file that includes the files for the previous version. In these instances, the entire newly created container file may be transmitted over a network and stored in the data storage, instead of just sending the new or modified files, since the container file is a new container file. According to an example of the present application, the container file management system determines that the newly generated container file is a regenerated container file related to an existing container file. For example, the regenerated generated container file may have the same or similar files as the existing container file, and may have the same or similar file metadata, such as the same or similar file name, file size, file owner, etc. The differences from the existing container file are sent to the data storage for storing the regenerated container file instead of sending all the files for the regenerated container file to the data storage. This saves bandwidth and data storage space.

FIG. 1 shows a container file management system 100 connected to a data storage 120 to store container files on the data storage. The container file management system 100 may be provided on a computer 110. For example, the container file management system 100 includes machine readable instructions executed by a processor 111 of the computer 110. The machine readable instructions may be stored on a non-transitory computer readable medium of the computer 110, such as memory 113.

The data storage 120 may be connected to the computer 110 via a communications medium 112. If the data storage 120 is local to the computer 110, the communications medium 112 may be a bus. In another example, the communications medium 112 is a network, and the data storage 120 may include a network storage device. The data storage 120 may implement a storage system, such as an object storage system, file system, block storage, etc. The data storage 120 may include a server, such as a database server, that stores data for multiple computer systems.

The container file management system 100 detects creation of a new container file, and determines whether the new container file is a regenerated container file of an existing container file. For example, the container file management system 100 stores rules to determine whether a newly created container file is a regenerated container file related to an existing container file. The rules may specify to compare metadata of the newly created container file to metadata of existing container files to determine whether the newly created container file is a regenerated container file related to an existing container file. In a simple example, a rule may specify that if the newly created container file has the same file name as an existing container file, it is a regenerated container file of the existing container file. In another example, the rule may test for multiple factors, such as the same or similar name, and that the newly created container file has all or most of the files of the existing container file.

If a regenerated container file is detected, the container file management system 100 determines a difference between the regenerated container file and the related existing container file, and sends the differences to the data storage 120 for storage. For example, if a new file is detected in the regenerated container foe, that is not in the related existing container file, the new file is sent to the data storage 120 for storage without sending all the other files, since all the other files may already be stored in the data storage 120.

The container file management system 100 generates manifests for container files, including regenerated container files. Manifests for container files may be used to determine differences between the container files. An example of the structure of the manifest is as follows:

```
<File position information>
<unique-file-id>, <file-id-offset>,<file-hash>,<file-length>;
...
<unique-file-id>, <file-id-offset>,<file-hash>,<file-length>;
<File segment location information>
<file-hash>, <segment -id>, <segment-offset>, <file-length>;
...
<file-hash>,<segment-id>,<segment-offset>,<file-length>.
```

The <File position information> is the position of each file in the container file. The metadata for each file includes a unique file id, a file id offset, a file hash, and file length. The file hash is a hash of the file. The same hash function may be used to generate the file hash for each file. If two files have the same file hash, they may be assumed to be the same file. The container file management system 100 may compare file hashes in two container files to determine if the container files contain the same files or different files. Unique file ids may also be compared. The file id offset is the position within the container file, such as the number of bytes from the start of the container file or the start of a segment. Thus, the manifest specifies the order of the files in the container file, and allows the container file to be recreated as needed according to the manifest.

The <File segment location information> is the location of the file in the data storage 120. For example, the files are stored in segments on the data storage 120. The metadata may include file hash, segment id, segment offset, and file length. The segment id identifies the segment storing the file, and the segment offset is the number of bytes from the beginning of the segment where the file is stored. Objects may be stored in the data storage 120 as multiple smaller segments that are easier to transmit over a network.

Before a container file is stored in the data storage 120, the manifest is generated that includes the file position information for each file in the container file, such as unique file id, file hash, file length, and file location (i.e., file id offset). The files in the container file are stored in segments in the data storage 120 and the manifest is updated to include the file segment location information once the segment information is determined, such as segment id and segment offset for each stored file.

Before storing a regenerated container file, a manifest is created for the regenerated container file which includes the file position information. The manifest is compared to the manifest of the related existing container file to identify the differences. For example, new files in the regenerated file are detected and only the new files are sent to the data storage 120 because the data storage 120 already stores the other files that are in the related existing container file. The container file management system 100 may instruct the data storage 120 to store the new files in a new segment. Once the segment information is determined, it is added to the file segment location information of the manifest of the regenerated container file. A file may be deleted in the regenerated container file. For example, if the regenerated container file does not include a file that is in the related existing container file, then the manifest of the regenerated container file is generated to reflect that the file is not included. If no files are added and only one or more files are deleted in the regenerated container file, then no files are sent to the data storage 120. For example, only the manifest for the regenerated container file is sent to the data storage 120, because the data storage 120 already stores all the files for the regenerated container file.

Figure 2:
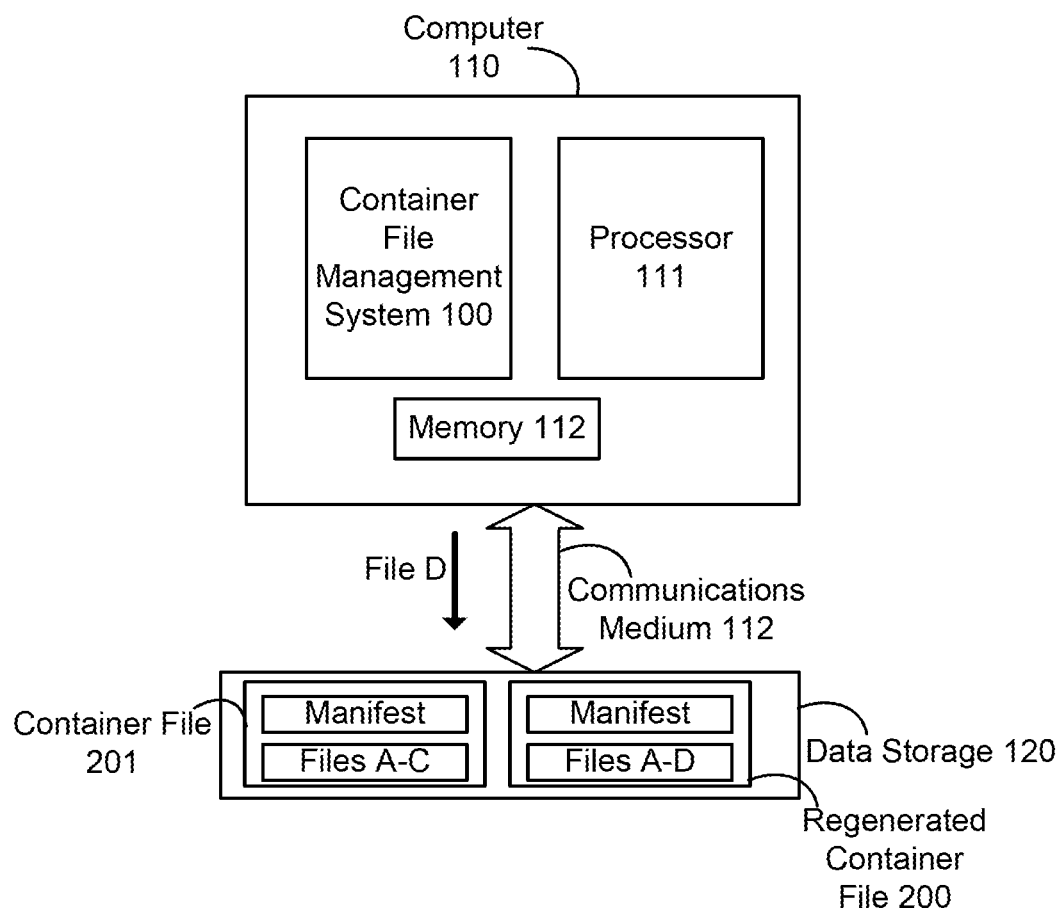
FIG. 2 shows storing a regenerated container file, according to an example of the present disclosure.

FIG. 2 shows an example of storing a regenerated container file 200 in the data storage 120. A new container file is created that contains files A-D. Based on rules, the container file management system 100 determines that the new container file is a regenerated container file, i.e., regenerated container file 200, of container file 201 which includes files A-C. The container file management system 100 compares the manifests of container files 200 and 201 and determines that the difference is the regenerated container file 200 contains a new file, i.e., file D. The file D is sent to the data storage 120, and stored in a new segment.

For example, files A-C may be stored in a first segment and file D is stored in a second segment. The data storage 120 stores the manifest for the regenerated container file 200 and the container file 201, and the files A-D. Although not shown, the manifests and files for the regenerated container file 200 and the container file 201 may also be stored in data storage in the computer 110.

Figure 3:
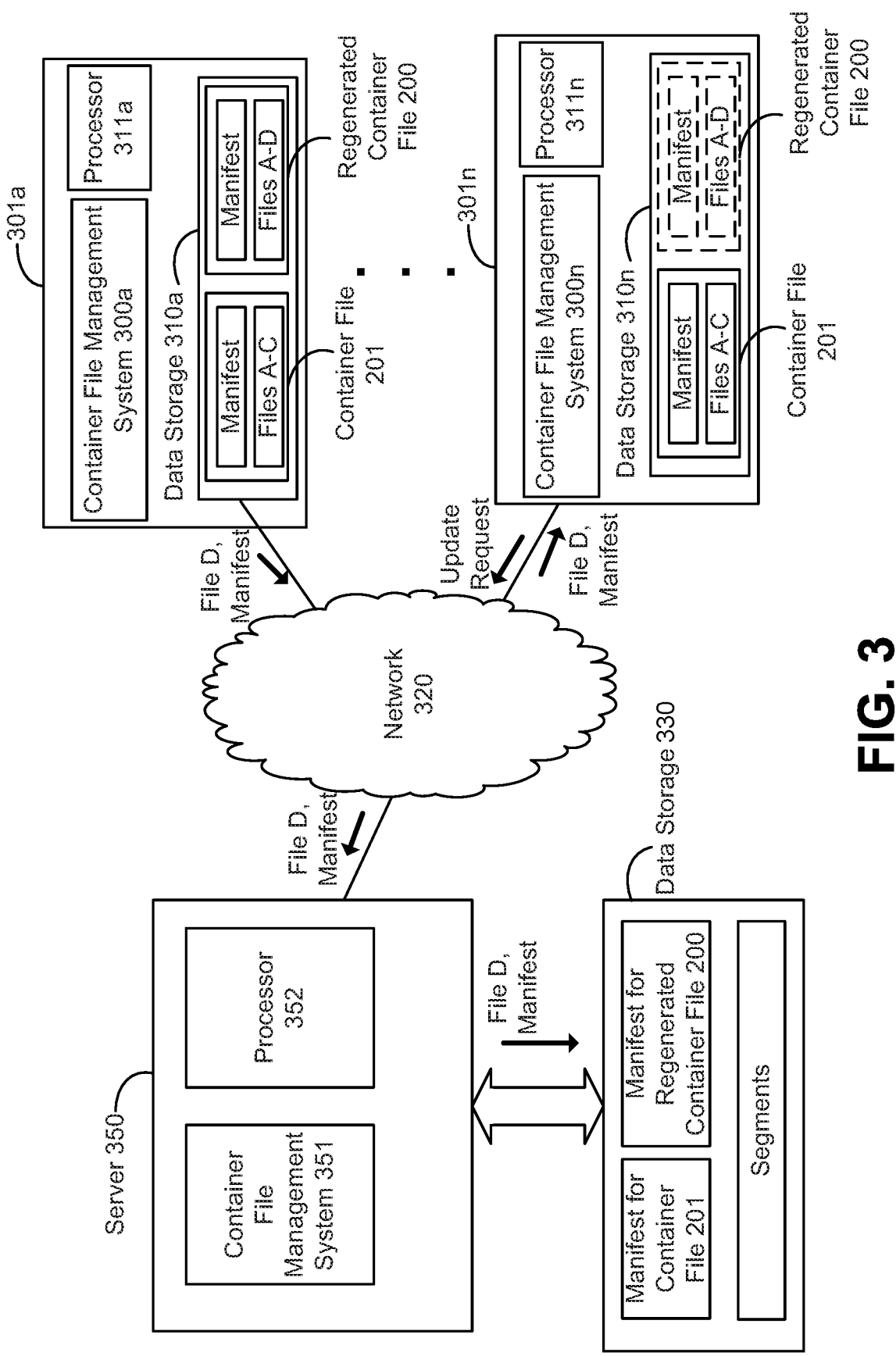
FIG. 3 shows a container file management system in a client-server environment, according to an example of the present disclosure.

FIG. 3 shows an example of a client-server environment for the container file management system. For example, clients 301a-n are shown and include client-side container file management systems 300a-n. The clients 301a-n may include computers with processors 311a-n and local data storage 310a-n that can store files, container files, manifests, etc. The clients 301a-n are connected to the server 350 via network 320. The data storage 330 is connected to the server 350. The server 350 runs server-side container file management system 351, which may include machine readable instructions stored on a non-transitory computer readable medium and executed by processor 352 of the server 350. Files for the container files may be transmitted in segment-sized portions over the network 320 to store in the data storage 330. Also, files for the container files may be transmitted in segment-sized portions over the network 320 from the server 350 to the clients 301a-n to retrieve container files for use on the clients 301a-n.

FIG. 3 follows the example of FIG. 2, whereby the regenerated container file 200 is stored in the data storage 330. In FIG. 3, the file D and its manifest are transmitted from the client 301a to the server 350 and the data storage 330 over the network 320. The regenerated container file 200 and the manifest may also be stored at the client 301a. The file D may be transmitted in segment-sized portions over the network 320 to the server 350. The container file management system 351 may store the file D in segments in the data storage 330. A segment-sized portions sent over the network 320 may be the same size of a segment in the data storage 330. The manifest for the regenerated container file 200 is updated to include the segment information of the segment in the data storage storing the file D, such as file hash, segment id, segment offset, and file length. The updated manifest for the regenerated container file 200 is sent back to the client 301a so the client 301a may store the updated manifest, as is further described below.

FIG. 3 also shows an example whereby client 301n synchronizes with the regenerated container file 200. For example, the client 301n stores the container file 201. The client-side container file management system 300n detects that the regenerated container file 200 related to the file 201 is created and stored on the data storage 330. The client-side container file management system 300n retrieves the manifest for the regenerated container file 200 and the segments for the new file D from the data storage 330, so the client 301n has the updated version of the container file, i.e., the regenerated container file 200. The client 301n for example already stores files A-C since it previously stored the container file 201, so it only retrieves file D.

The server-side container file management system 351 stores the files for the container files in the data storage 330 and stores the manifests, and responds to requests for container files. In addition, the server-side container file management system 351 assigns segments for storing new files for a container file. For example, the client-side container file management system 300a sends the file D and a request to store the file D on a new segment to the server-side container file management system 351. The server-side container file management system 351 stores the file D in a new segment, and the segment id of the new segment is sent to the client-side container file management system 300a. The client-side container file management system 300a can update the manifest for the regenerated container file 201 with the segment id, or the server-side container file management system 351 updates the manifest with the segment information and sends it to the client-side container file management system 300a. In either case, the updated manifest is stored on the data storage 330 and may also be stored at the client 300a.

The server-side container file management system 351 may include metadata in the manifest for the container file 201 that indicates the container file 201 has been regenerated as regenerated container file 200. When a client requests container file 201, the client may receive the manifest for the regenerated container file 200 and the new file D (e.g., sent in segment-sized portions), and an indication that the regenerated container file 200 is a regenerated container file of the container file 201. For example, the client 301n stores the container file 201. The client-side container file management system 300n may send an update request to the server-side container management system 351 to determine whether there are any regenerated files for the container file 201. The server-side container management system 351 may respond with the manifest for the regenerated container file 200 and the file D, which is the difference between the container files 200 and 201. The client-side container file management system client 300n may store the regenerated container file 200 and the manifest, which is shown in dashed lines to illustrate that it is stored at the client 300n in response to the update request.

Figure 4:
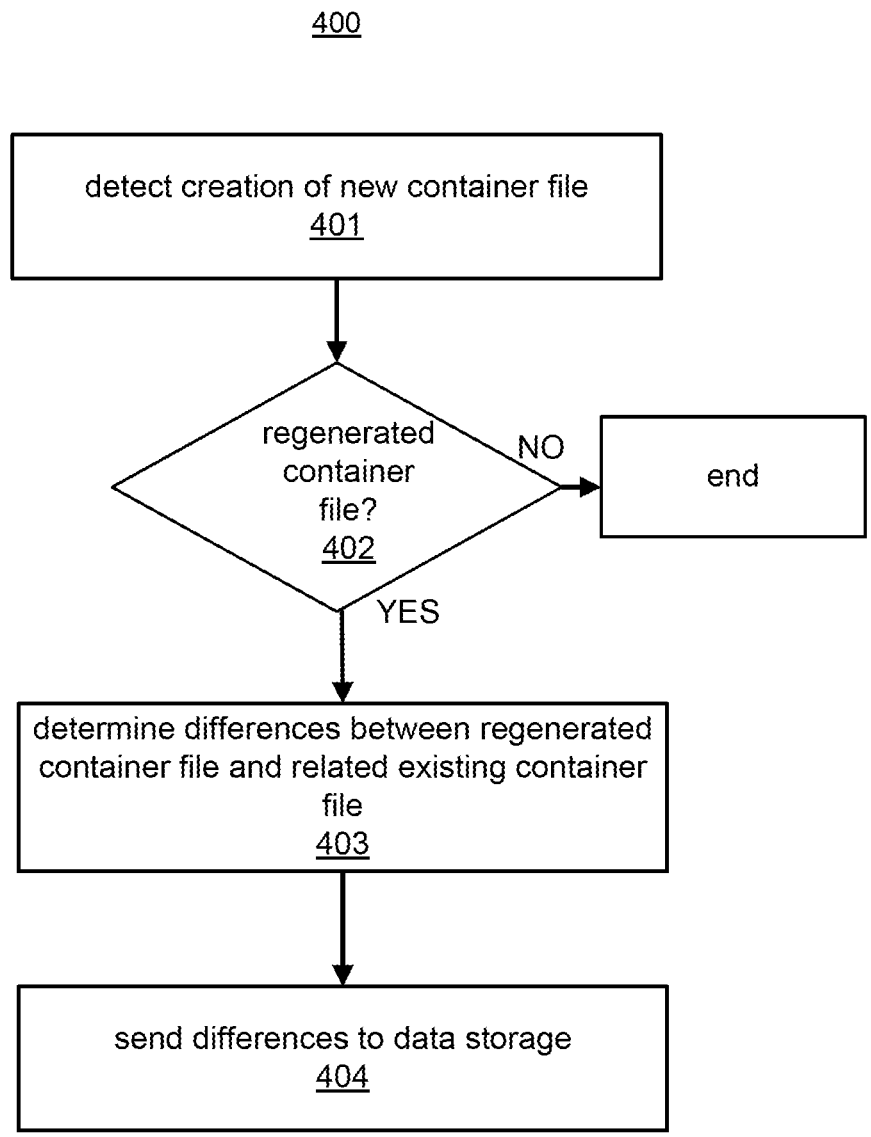
FIGS. 4 and 5 show methods of storing a regenerated container file, according to examples of the present disclosure.

FIG. 4 illustrates a method 400 for container file management of a regenerated container file. The method 400 and other methods described below may be performed by the container file management system 100, the client-side container file management systems 300a-n, and/or the server-side container file management system 351, which are collectively referred to as the container file management system in the methods described below.

At 401, the container file management system detects creation of a new container file. For example, the container file management system may by machine readable instructions executed on a computer. The container file management system may receive user selections of files to include in the new container file and other information, such as file name, to create the container file.

At 402, the container file management system determines whether the newly created container file is a regenerated container file of an existing container file stored in a data storage. Rules that compare metadata of the newly created container file and existing container files may be applied to determine whether the newly created container file is a regenerated container file of an existing container file.

If the newly created container file is determined to be a regenerated container file, at 403, the container file management system determines differences between the regenerated container file and the related existing container file. Manifests between the container files may be compared to determine the differences.

At 404, the container file management system sends the differences to the data storage 120 to store the regenerated container file. A manifest for the regenerated container file is also stored. The differences may include a new or modified file in the regenerated container file that is different from the files in the related container file.

Figure 5:
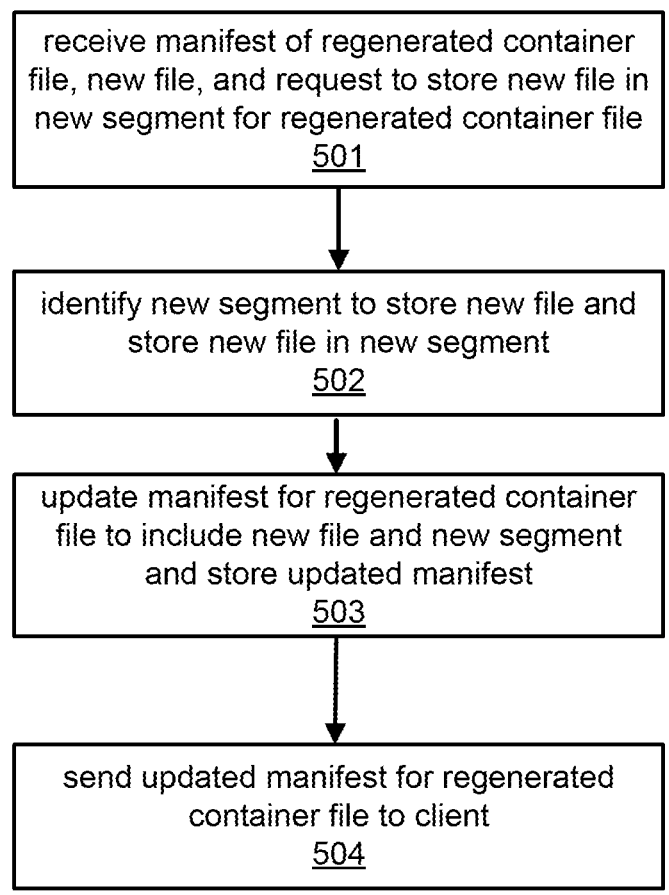

FIG. 5 illustrates a method 500 for storing a regenerated container file in data storage. The steps of the method 500 may be performed by the server-side container file management system 351 and is described with respect to FIG. 3 by way of example. At 501, the server 350 receives the manifest of the regenerated container file 201, and the new file, e.g., file D, and a request to store the new file in a new segment in the data storage 120 and append to the regenerated container file 201. With regard to sending the file D, the client-side container file management systems 300a, for example, sends the differences between the container files 200 and 201 to the server 350. For example, the client-side container file management systems 300a sends the file D (e.g., only sends the differences between container files 200 and 201, i.e., the new file D) and does not send the other files A-C to the server-side container file management system 351. At 502, the server-side container file management system 351 identifies a new segment to store the new file in response to the request to store the new file in a new segment from the client-side container file management systems 300a, and stores the new file in the new segment. At 503, the server-side container file management system 351 updates the manifest for the regenerated container file 201 to include the new segment and the new file stored in the new segment, and stores the updated manifest in the data storage 120. At 504, the updated manifest for the regenerated container file 201 is sent to the client-side container file management systems 300a, which stores the updated manifest.

Figure 6:
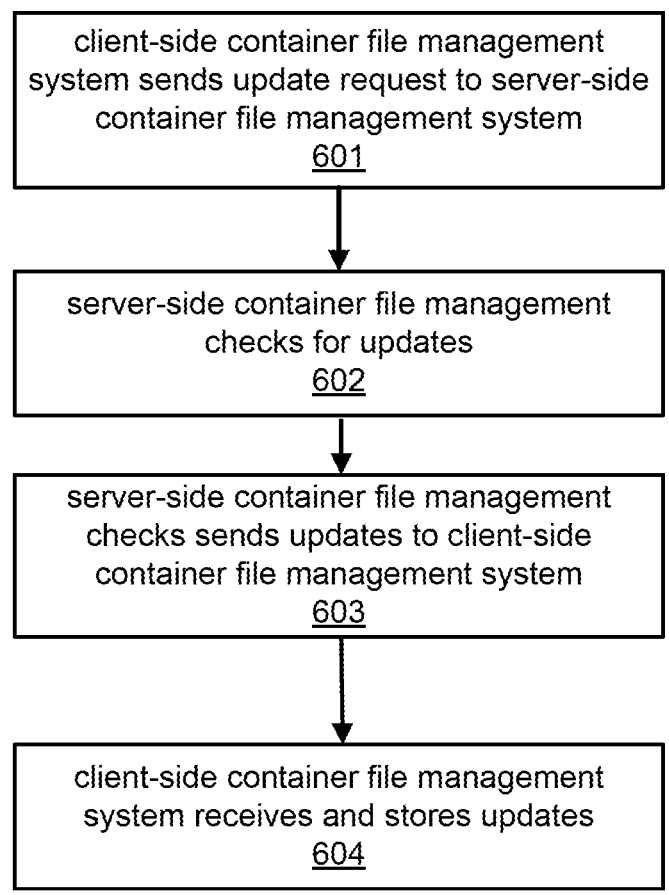
FIG. 6 shows a method of storing an updated container file, according to an example of the present disclosure.

FIG. 6 illustrates a method 600 for updating a container file, such as synchronizing a container file stored on a client device. The method 600 is described, by way of example, with respect to FIG. 3 and storing the updated regenerated container file in the client 301n. At 601, the client-side container file management system 300n sends an update request to the server-side container file management system 351 for updated container files. For example, the client 301n stores the container file 201, and when the client 301n connects to the server 250, it requests the server-side container file management system 351 to send any updated container files. The client-side container file management system 300n may send its manifests for container files to the server-side container file management system 351 so the server-side container file management system 351 can check for regenerated container files related to the manifests. At 602, the server-side container file management system 351 checks if it has any regenerated container files for the manifests. At 603, the server-side container file management system 351 sends updates. For example, the server-side container file management system 351 identifies regenerated container file 200 for the container file 201, and sends the manifest and the new file D for the regenerated container file 201 to the client 301n in response to the request. At 604, the client 301n receives and stores the updates for the container file 201, such as the manifest and the new file D for the regenerated container file 201. In an example, only the differences are sent to the client 301n, so files A-C may not be sent to the client 301n. The server-side container file management system 351 may determine the differences by comparing the manifests of the container file 201 and the regenerated container file 200.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims, and their equivalents, in which all terms are meant in their broadest reasonable sense unless otherwise indicated.

What is claimed is:

1. A container file management system comprising:
a processor to:
detect a creation of a new container file;
determine whether the new container file is a regenerated container file of an existing container file, wherein the regenerated container file is created from an empty container file and not created from the existing container file;
in response to a determination that the new container file is the regenerated container file of the existing container file, create, for the regenerated container file, a manifest that includes file position information identifying positions of regenerated files located in the regenerated container file;
compare the manifest for the regenerated container file to a manifest for the existing container file stored in a data storage to determine a new file of the regenerated container file that is different from existing files of the existing container file;
send a request to the data storage to store the new file of the regenerated container file in a new segment in the data storage that is different from first segments in the data storage that store the existing files of the existing container file; and
in response to receiving a location of the new segment in the data storage where the new file is stored, update the manifest for the regenerated container file to include segment location information including the location of the new segment in the data storage where the new file is stored.

2. The container file management system of claim 1, wherein to determine whether the new container file is the regenerated container file of the existing container file, the processor is to compare metadata of the new container file to metadata of all container files, including the existing container file, stored in the data storage.

3. The container file management system of claim 2, wherein the metadata of the new container file comprises a container file name and a container file size.

4. The container file management system of claim 1, wherein the manifest for the existing container file includes file position information identifying positions of the existing files located in the existing container file and segment location information identifying locations of the first segments in the data storage where the existing files are stored.

5. The container file management system of claim 4, wherein the file position information identifying the positions of the existing files located in the existing container file includes, for each of the existing files, a unique file identifier (id), a file id offset, a file hash, and a file length.

6. The container file management system of claim 1, wherein the processor is to:
send the updated manifest for the regenerated container file to the data storage for storage.

7. The container file management system of claim 1, wherein the processor is to send the new file of the regenerated container file to the data storage in predetermined segment-sized bytes over a network.

8. The container file management system of claim 1, wherein the data storage comprises object storage, and the object storage stores the new file of the regenerated container file.

9. A server connectable to a plurality of clients over a network, the server comprising:

a data storage to store files for container files in segments in the data storage, wherein each segment has a predetermined number of bytes; and a processor to:

receive, from one client of the plurality of clients via the network, a manifest for a regenerated container file, wherein the manifest for the regenerated container file includes metadata identifying regenerated files in the regenerated container file and positions of the regenerated files in the regenerated container file, wherein the regenerated container file is related to an existing container file stored in the data storage and wherein the regenerated container file is created from an empty container file and not from the existing container file;

receive, from the client, a new file of the regenerated container file that is different from existing files of the existing container file;

request the data storage to store the new file of the regenerated container file in a new segment in the data storage that is different from first segments in the data storage that store the existing files of the existing container file;

in response to receiving a location of the new segment in the data storage where the new file is stored, update the manifest for the regenerated container file to include segment location information including the location of the new segment in the data storage where the new file is stored; and send the updated manifest for the regenerated container file to the client via the network.

10. The server of claim 9, wherein the manifest for the existing container file comprises:

file segment location information identifying a location of each of the first segments in the data storage where the existing files are stored.

11. The server of claim 9, wherein the manifest for the regenerated container file further comprises, for each of the regenerated files in the regenerated container file, a unique file identifier (id), a file id offset, a file hash, and a file length.

12. A method comprising:

detecting a creation of a new container file;

determining that the new container file is a regenerated container file of an existing container file, wherein the regenerated container file is created from an empty container file and not from the existing container file;

in response to the determination that the new container file is the regenerated container file of the existing container file, creating, for the regenerated container file, a manifest that includes file position information identifying positions of regenerated files in the regenerated container file;

comparing the manifest for the regenerated container file to a manifest for the existing container file to determine a new file of the regenerated container file that is different from existing files of the existing container file;

sending a request to a data storage to store the new file of the regenerated container file in a new segment in the data storage that is different from first segments in the data storage that store the existing files of the existing container file; and in response to receiving a location of the new segment in the data storage where the new file is stored, updating the manifest for the regenerated container file to include segment location information including the location of the new segment in the data storage where the new file is stored.

13. The method of claim 12, wherein the manifest for the regenerated container file further comprises, for each of the regenerated files in the regenerated container file, a unique file identifier (id), a file id offset, a file hash, and a file length.

14. The method of claim 12, wherein the manifest for the existing container file comprises storage information including, for each of the existing files of the existing container file stored in the data storage, a segment id, a segment offset, and a file length.

15. The server of claim 9, wherein the manifest for the existing container file includes, for each of the existing files, a segment id, a segment offset, and a file length.

16. The method of claim 12, wherein determining that the new container file is the regenerated container file of the existing container file comprises:

comparing metadata of the new container file to metadata of all container files, including the existing container file, wherein the metadata of the new container file comprises a container file name and a container file size.

* * * * *